(12) United States Patent
Lazarini

(10) Patent No.: US 11,485,319 B2
(45) Date of Patent: Nov. 1, 2022

(54) LOW POWER AUTHENTICATION AND UNLOCK SYSTEM

(71) Applicant: GM GLOBAL TECHNOLOGY OPERATIONS LLC, Detroit, MI (US)

(72) Inventor: Marcelo Lazarini, Shelby Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 128 days.

(21) Appl. No.: 17/196,861

(22) Filed: Mar. 9, 2021

(65) Prior Publication Data

US 2022/0289139 A1  Sep. 15, 2022

(51) Int. Cl.
*B60R 25/24* (2013.01)
*E05B 81/82* (2014.01)
*E05B 81/86* (2014.01)
*B60R 25/40* (2013.01)
*B60R 25/00* (2013.01)
*B60R 25/01* (2013.01)
*E05B 81/78* (2014.01)

(52) U.S. Cl.
CPC ............ *B60R 25/24* (2013.01); *B60R 25/002* (2013.01); *B60R 25/01* (2013.01); *B60R 25/40* (2013.01); *E05B 81/78* (2013.01); *E05B 81/82* (2013.01); *E05B 81/86* (2013.01); *B60R 2325/10* (2013.01)

(58) Field of Classification Search
None
See application file for complete search history.

(56) References Cited

U.S. PATENT DOCUMENTS 7,902,960 B2 * 3/2011 Tsuchimochi ...... B60R 25/2072
340/10.2

* cited by examiner

*Primary Examiner* — K. Wong
(74) *Attorney, Agent, or Firm* — Lorenz & Kopf LLP

(57) ABSTRACT

The present application generally relates to battery powered door unlock mechanisms. More specifically, the application teaches an unlock system including a door unlock mechanism, a capacitive circuit having a first time response, a resistive-capacitive circuit having a second time response wherein the second time response is longer than the first time response, a battery for coupling a battery charge to the capacitive circuit and the resistive capacitive circuit in response to a door unlock authentication signal, and a relay for coupling a first charge from the capacitive circuit to the door unlock mechanism in response to the relay being activated by a second charge from the resistive-capacitive circuit after the second time response.

20 Claims, 5 Drawing Sheets

100

LOW POWER AUTHENTICATION AND UNLOCK SYSTEM

BACKGROUND

The present application generally relates to electronic vehicle lock and authentication systems. More specifically, the application teaches a method and apparatus for powering a door unlock relay using capacitive and resistive capacitive circuits in response to an authentication signal.

Vehicle security has long been a concern for vehicle owners and manufacturers. Vehicles traditionally have been outfitted with mechanical access authentication, such as a key blade and door key cylinder, in vehicle doors, trunk openings and ignition systems. These mechanical locks are prone to freezing and wear. As vehicle technology advanced, keyless systems have been introduced which unlock the vehicle locks electrically in response to an electronic access signal. The electronic access signal may include a user input for entering an access code or may employ an electronic device for transmitting a wireless signal to a receiver in the vehicle. A controller coupled to the receiver may then authenticate the received signal and transmit a control signal to a locking actuator which unlocks the door in response to the authenticated signal.

As vehicle owners become more accustom to keyless entry systems, traditional mechanical locks are being used less and less. There is therefore a trend to eliminate these mechanical locks for improved aesthetics, cost reduction, and improved security. The challenges arise on how execute robust and cost-effective electronic-only access for emergency scenarios when primary access mean is not available. Traditional back-up battery solutions to provide access have been inefficient and relatively expensive. A typical low current battery does not provide the required current to actuate the driver door unlock latch. It would be desirable to overcome these problems to provide a low power authentication and unlock system.

The above information disclosed in this background section is only for enhancement of understanding of the background of the invention and therefore it may contain information that does not form the prior art that is already known in this country to a person of ordinary skill in the art.

SUMMARY

Disclosed herein are vehicle systems, vehicle user access systems and related control logic for provisioning vehicle user access systems, methods for making and methods for operating such systems, and motor vehicles equipped with user access systems. By way of example, and not limitation, there is presented a low power, backup battery-controlled system for door unlock authentication and activation on vehicles without mechanical access authentication systems, such as vehicles with electronic access only.

In accordance with an aspect of the present invention, an unlock system including a door unlock mechanism, a capacitive circuit having a first time response, a resistive-capacitive circuit having a second time response wherein the second time response is longer than the first time response, a battery for coupling a battery charge to the capacitive circuit and the resistive capacitive circuit in response to a door unlock authentication signal, and a relay for coupling a first charge from the capacitive circuit to the door unlock mechanism in response to the relay being activated by a second charge from the resistive-capacitive circuit after the second time response.

In accordance with another aspect of the present invention, an unlock system further including an antenna for receiving an authentication signal and a processor for coupling a control signal to the battery in response to the authentication signal wherein the battery charge is coupled from the battery to the capacitive circuit and the resistive capacitive circuit in response to the control signal.

In accordance with another aspect of the present invention, an unlock system wherein the antenna is a near field communication antenna and wherein the battery is charged in response to the authentication signal.

In accordance with another aspect of the present invention, wherein the antenna is a near field communication antenna and wherein the processor is powered in response to the authentication signal.

In accordance with another aspect of the present invention, an unlock system wherein the first charge is at a maximum voltage at the second time response.

In accordance with another aspect of the present invention, an unlock system wherein the authentication signal is transmitted by a service provider via a wireless network.

In accordance with another aspect of the present invention, an unlock system wherein the authentication signal is transmitted from a mobile device in response to a user input.

In accordance with another aspect of the present invention, an interlock for coupling the a second charge from the resistive capacitive circuit to the relay and wherein the a second charge is not coupled to the relay by the interlock in response to the interlock receiving an interlock signal generated by a door latch control module.

In accordance with another aspect of the present invention, a method for actuating a vehicle door lock mechanism including receiving, via an antenna, a door unlock signal, coupling, by a switch, a battery charge from a battery to a capacitive circuit and a resistive capacitive circuit in response to the door unlock signal, generating, by the capacitive circuit, a first charge at a first time, generating, by the resistive capacitive circuit, a second charge at a second time, wherein the second time is later than the first time, coupling the second charge to a relay at the first time, closing the relay in response to the first charge at the second time, and actuating the vehicle door lock mechanism in response to the second charge coupled to the vehicle lock mechanism from the capacitive circuit via the relay.

In accordance with another aspect of the present invention, wherein a time delay between the second time and the first time results from a reactance of the resistive capacitive circuit.

In accordance with another aspect of the present invention further including authenticating the door unlock signal by an authentication processor to generate an authenticated door lock signal and wherein the battery charge is coupled to the capacitive circuit and the resistive capacitive circuit via the switch in response to the authenticated door lock signal.

In accordance with another aspect of the present invention, wherein the antenna is a near field communication antenna and wherein the authentication processor is powered in response to the authentication signal In accordance with another aspect of the present invention, wherein the antenna is a near field communication antenna and wherein the battery is charged in response to the door unlock signal.

In accordance with another aspect of the present invention, wherein the first charge is at a maximum voltage at the second time.

In accordance with another aspect of the present invention, wherein the door unlock signal is transmitted by a service provider via a wireless network.

In accordance with another aspect of the present invention, wherein the door unlock signal is transmitted from a mobile device in response to a user input.

In accordance with another aspect of the present invention, a door unlock and authentication system including an authentication processor configured for providing an authenticated door unlock signal in response to a received door unlock request, a battery for powering the authentication processor and providing an input charge, a switch for coupling the input charge to a capacitive circuit and a resistive capacitive circuit in response to the authenticated door unlock signal, the capacitive circuit for generating a first charge at a first time in response to the input charge, the resistive capacitive circuit for generating a second charge at a second time in response to the input charge, a relay having an input coupled to the capacitive circuit for receiving the first charge and a control input coupled to the resistive capacitive circuit for closing the relay in response to the second charge, and a vehicle door lock mechanism configured to unlock a vehicle door in response to the first charge wherein the relay is closed in response to the second charge at the second time and the first charge is coupled to the vehicle door lock mechanism at the second time.

In accordance with another aspect of the present invention wherein the door unlock requested is received from a user device via an antenna.

In accordance with another aspect of the present invention wherein the door unlock request forms a portion of a radio frequency signal received via a near field antenna and wherein the authentication processor is powered by the radio frequency signal.

In accordance with another aspect of the present invention wherein the door unlock request forms a portion of a radio frequency signal received via a near field antenna and wherein the battery is charged by the radio frequency signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. For example, the circuitry, transmission lines and antennas of the present invention has particular application for use on a vehicle. However, as will be appreciated by those skilled in the art, the invention may have other applications.

Figure 1:
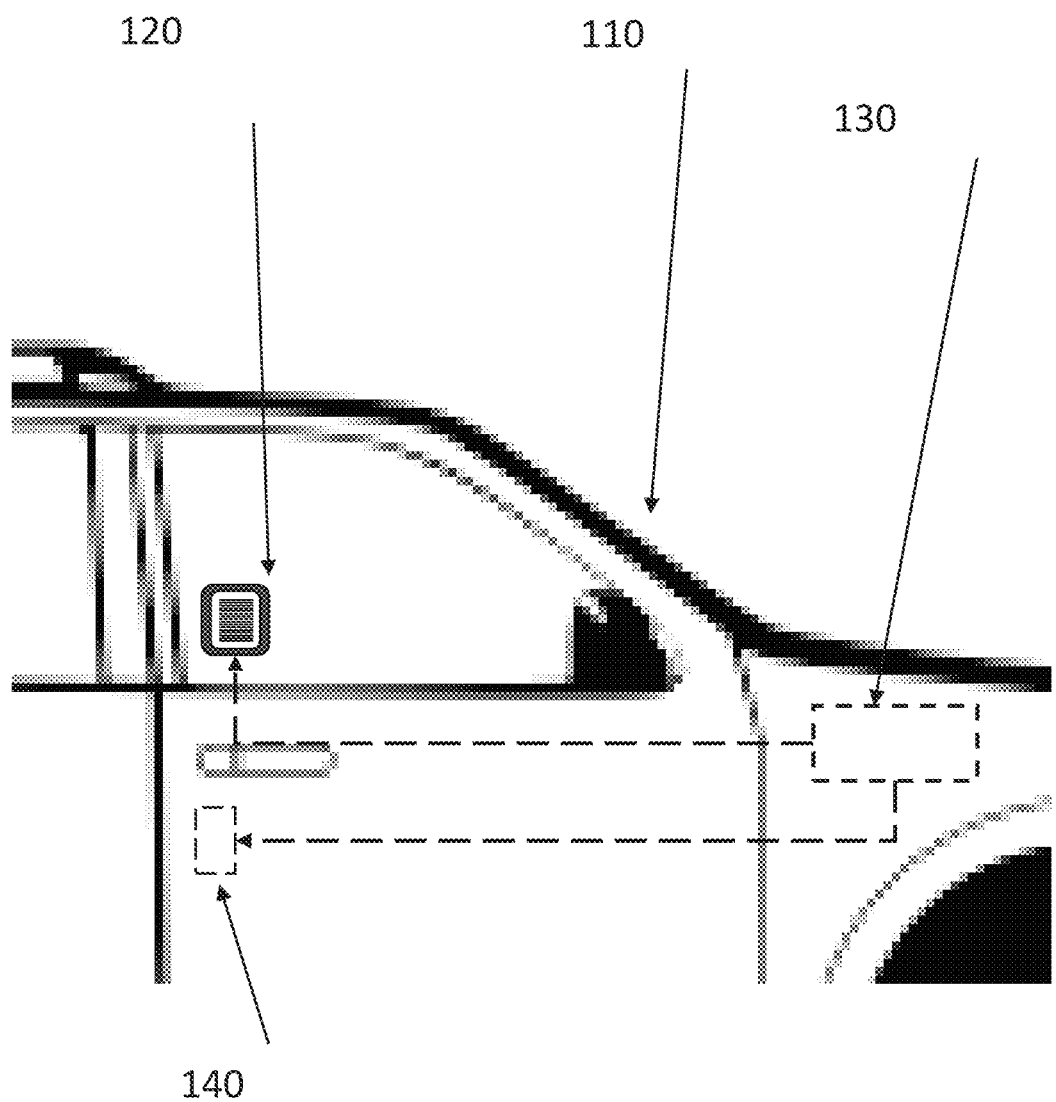
FIG. 1 illustrates an exemplary application of the low power authentication and unlock system in an automotive environment according to an embodiment.

FIG. 1 illustrates an exemplary application of the vehicle integrated antenna with enhanced bandwidth in an automotive environment 100. The exemplary application shows a vehicle 110 with window, an exemplary antenna 120 mounted to the window. The system also has a control module 130 and door lock actuator 140 mounted within the vehicle and not in view of a user of the vehicle.

The exemplary system is configured to provide a backup battery-controlled system for door unlock authentication and activation on vehicles without door key cylinder or vehicles with electronic access only. The system provides an arrangement for an optimized back-up battery authentication and/or door unlock/unlatch activation where simple electronics can be applied with a cost-effective backup battery and alternatively, usage of wireless energy from an NFC source. This results in a lower cost back-up vehicle access system, allowing complexity reduction and alternatively warranty reduction by removing back-up battery.

In this exemplary application, the antenna 120 may be a thin mire mesh near field communications (NFC) antenna. When a user desires access to the vehicle, an NFC device such as a mobile phone, may be placed proximate to the antenna 120. The user's NFC device may then transmit an authentication signal to the antenna 120. The authentication signal is then coupled to the control module 130 where it is authenticated. If the authentication signal is authenticated, the control module 130 couples a control signal to the door lock actuator 140 to unlock the door. The door lock actuator 140 may include an electrical to physical device, such as an electric motor or switch to unlock the mechanical door lock in response to the control signal. Alternatively, the antenna may be a radio frequency antenna, such as a monopole antenna, configured to receive a radio frequency signal from a transmitter, such as a key fob, or other authentication device.

Figure 2:
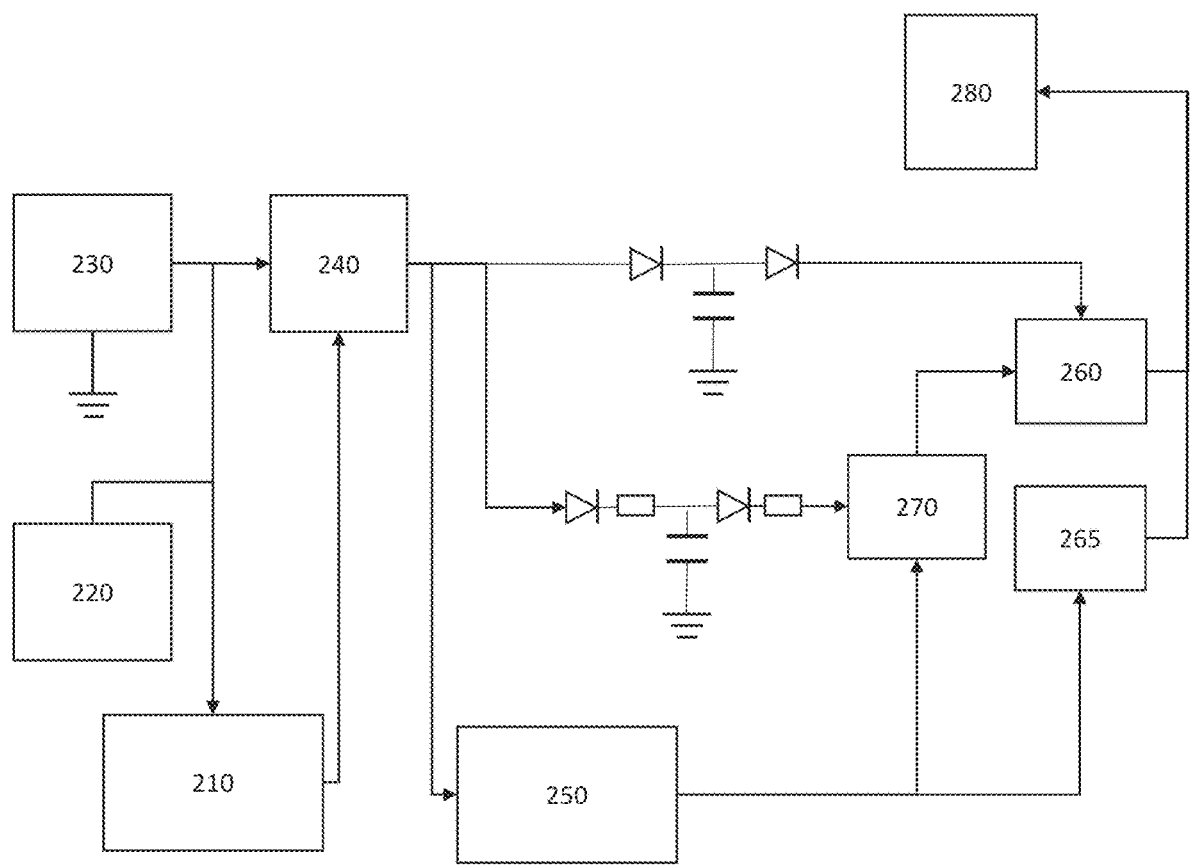
FIG. 2 illustrates a block diagram of an exemplary low power authentication and unlock system according to an embodiment.

Turning now to FIG. 2, an exemplary low power authentication and unlock system 200 according to the present disclosure is shown. In this exemplary embodiment, no traditional vehicle battery power is available to the system 200 to actuate a vehicle lock in the powered vehicle mode. The system 200 includes an NFC antenna 220, a backup battery 230 a backup authentication control module 210, a switch 240, a backup switch 260 and a door unlock latch 280.

The NFC antenna 220 may be used to receive an authentication signal from an NFC device, such as a key fob, mobile phone or the like. In one exemplary embodiment, a current induced into the NFC antenna by a user device may be used to charge the backup battery 230 and/or power the backup authentication control module 210. Alternatively, the backup battery 230 may be pre-charged by the vehicle charging system before loss of vehicle power.

The backup authentication control module 210 is operative to receive an authentication signal from an NFC device via the NFC antenna or via a radio frequency signal transmitted by a key fob or the like to an antenna. The backup authentication control module 210 may be powered by the backup battery 230 and/or via current from the NFC antenna 220. The backup authentication control module 210 determines if vehicle access is granted in response to the received authentication signal. In one exemplary embodiment, the backup authentication control module 210 is a keyless entry control module or the like.

If vehicle access is granted, the backup authentication control module 210 couples a control signal to a switch 240 to provide an electrical connection between the backup battery 230 and the door latch control module 250. In one example, the control signal may be a DC voltage with an amplitude high enough to actuate the door unlock latch 280. With the switch 240 closed, the backup battery 230 is coupled to a first capacitor C1 via a first diode D1 and a second capacitor C2 via a third diode D3 and a first resistor R1. The first capacitor C1 is configured to charge for a length of time sufficient to store enough energy to actuate the door unlock latch 280 to unlock the vehicle, such as unlocking the driver's door. In this exemplary embodiment, the backup switch 260 is connected to the driver's door unlock latch 280 or unlocking mechanism. The second capacitor C2 and first resistor R1 are configured to delay the backup switch 260 activation until the first capacitor C1 has enough time to sufficiently charge.

After a sufficient time delay resulting from the values of the first resistor R1 and the second capacitor C2, the energy coupled from the second capacitor C2 provided as an activation trigger control is coupled to an optional interlock 270. In addition, an interlock signal is coupled to the interlock 270. The door latch control module 250 received a DC voltage from the backup battery 230 in response to switch 240 being closed. Typically, in a dead vehicle battery situation, the door latch control module 250 would not be powered and would be inactive. If the door latch control module 250 is active, the door latch control module 250 will couple an interlock signal to the interlock 270 preventing the coupling of the charge from C2 to the backup switch 260. The door latch control module 250 may then couple a control signal to the primary switch 265 actuate the door unlock latch 280 in a conventional manner.

In the instance that no interlock signal is generated by the door latch control module 250, the charge from C2 is coupled to the backup switch 260 after the time delay, closing the backup switch 260 and coupling the fully charged output of the C1 to the door unlock latch 280. In one exemplary embodiment, the door unlock latch 280 is mechanically assisted for unlatching, such as via a spring, pneumatic or hydraulic energy storage device to reduce the electrical power needed to unlock the door. In order to further optimize the execution, primary switch 270 can be used for both regular and backup activation of the door unlock latch 280.

Figure 3:
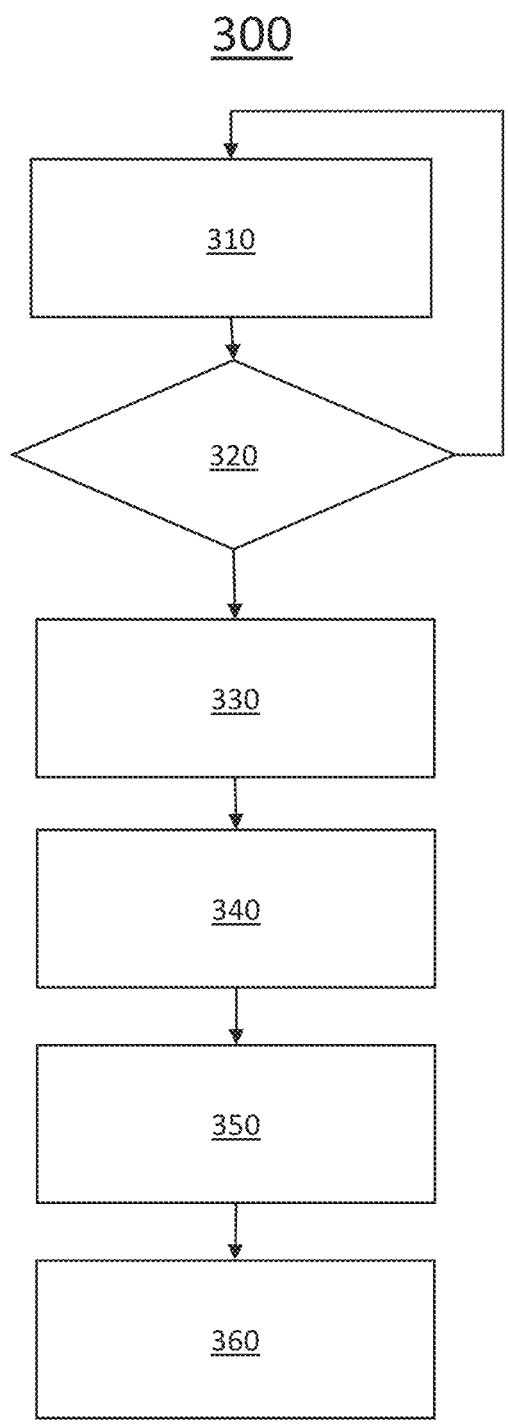
FIG. 3 shows a flowchart illustrating a method of implementing an exemplary low power authentication and unlock system according to an embodiment.

Turning now to FIG. 3, a flowchart illustrating an exemplary method 300 of implementation of the low power authentication and unlock system is shown. The method is first configured to receive 310 an authentication signal from a user device, such as a key fob or a mobile phone wherein the authentication signal includes an access code. The authentication signal may be received at an antenna coupled to a RF receiver. For example, the authentication may be a 315 MHz remote keyless system (RKS) signal with on-off keying, pulse width modulated, or the like. Alternatively, the authentication may be an NFC signal received at an NFC antenna from a mobile device at frequency of 13.56 MHz. In addition, the NFC signal may be coupled between the device and the antenna using inductive coupling. In one embodiment, the NFC signal may be used to charge a battery for powering an authentication processor or the like.

The authentication signal is next coupled to an authentication processor for authentication 320 of the access code. If the authentication signal is not successfully authenticated, the method returns to waiting to receive 310 a subsequent authentication signal. If the authentication signal is successfully authenticated, the method is next operative for coupling a signal to a first capacitor and a circuit including a first resistor and a second capacitor. In a circuit that contains both resistance and capacitance, the voltage and current will be out of phase with each other by some amount between 0° and 90°. In this configuration, the first capacitor begins to charge before the second capacitor allowing the first capacitor to be fully charged before the second capacitor. A diode may be placed before and after each of the capacitive and resistive capacitive circuits.

Once the first capacitor is fully charged, a following diode threshold voltage is exceeded, the charge is coupled 340 between the first capacitor and the switch input when the switch is still in the open state. Once the threshold voltage of the diode following the second capacitor is reached, a charge is coupled 350 between the second capacitor and a control port of the switch closing the switch. The charge from the first capacitor is then coupled through the switch to the door unlocking mechanism unlocking 360 the door. The door unlocking mechanism may include logic gates, actuators or the like.

Figure 4:
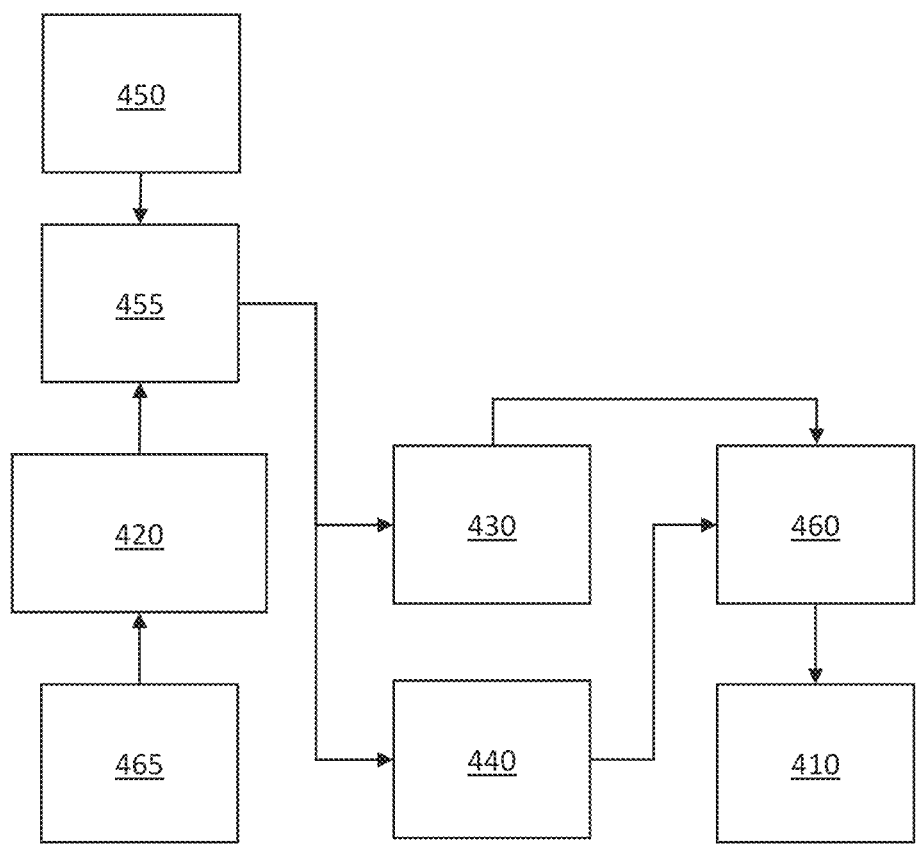
FIG. 4 shows a block diagram of an exemplary low power authentication and unlock system.

Turning now to FIG. 4, an exemplary low power authentication and unlock system 400 according to the present disclosure is shown. The system 400 may include a door unlock mechanism 410, a capacitive circuit 430, a resistive capacitive circuit 440, a battery 450, a switch 455, an antenna 465, a door unlock switch 460 and an authentication processor 420.

In this exemplary embodiment, an antenna 465 is configured for receiving an authentication signal for requesting a door unlock event in a vehicle. The authentication signal may be transmitted by a service provider via a wireless network, such as a cellular network. Alternatively, the authentication signal may be transmitted from a mobile device, such as a mobile phone or a key fob, in response to a user input. The user input may be a button push or an activation of an application or the like.

The processor 420 may be configured for receiving the authentication signal from the antenna and authenticating the authentication signal. For example, the authentication signal may include coded information from the transmitting device identifying the user or the transmitting device as an authorized party to request the door unlock event. The authentication signal may include a pin number, password, coded data or the like which is compared against data stored within the processor 420 and/or applied to an algorithm performed by the processor 420. If the authentication signal is authenticated, the processor 420 may the be configured to couple an unlock control signal to the switch 455. The switch is configured to couple a charge from the battery 450 to the capacitive circuit 430 and the resistive capacitive circuit 440 in response to the unlock control signal from the processor 420.

In one exemplary embodiment, the antenna 465 may be a near field communication antenna and wherein the battery is charged in response to a current induced by the authentication signal in the antenna 465 from the user device. In addition, the processor 420 may be powered in response to a current induced by the authentication signal in the antenna 465 from the user device.

In response to the charge coupled from the battery 450, the capacitive circuit 430 having a first time response charges to a first charge. This first charge may be a maximum voltage established in response to the voltage of the charge couple from the battery 450 and voltages losses resulting from components with the capacitive circuits, such as diode voltage drops and the like. The first charge is then coupled to an input of the switch 460.

In response to the charge coupled from the battery 450, the resistive-capacitive circuit 440, having a second time response, is charged to a second charge voltage. Due to the reactance of the resistive capacitive circuit 440 the second time response is longer than the first time response. The door unlock switch 460 is configured for coupling the first charge from the capacitive circuit to the door unlock mechanism 410 in response to the door unlock switch 460 being activated by the second charge from the resistive-capacitive circuit after the second time response. Ideally, the first charge is at a maximum voltage at the second time response such that when the door unlock switch 460 is closed a maximum current is delivered to the door unlock mechanism 410.

In one exemplary embodiment, the system 400 may further include an interlock for coupling the second charge from the resistive capacitive circuit to the door unlock switch 460 in response to an absence of an interlock signal. In this example, the second charge is not coupled to the door unlock switch 460 by the interlock in response to the interlock receiving an interlock signal generated by a door latch control module or the like.

In an exemplary embodiment, the exemplary low power authentication and unlock system 400 includes a door unlock and authentication system having an authentication processor configured for providing an authenticated door unlock signal in response to a received door unlock request, a battery for powering the authentication processor and providing an input charge, a switch for coupling the input charge to a capacitive circuit and a resistive capacitive circuit in response to the authenticated door unlock signal. The door unlock requested is received from a user device, such as a mobile phone or key fob, via an antenna. In one embodiment, the door unlock request forms a portion of a radio frequency signal received via a near field antenna and wherein the authentication processor is powered by the radio frequency signal. In an additional embodiment, the door unlock request forms a portion of a radio frequency signal received via a near field antenna and wherein the battery is charged by the radio frequency signal.

The system 400 may further include a capacitive circuit for generating a first charge at a first time in response to the input charge, a resistive capacitive circuit for generating a second charge at a second time in response to the input charge. The capacitive circuit and the resistive capacitive circuit may be coupled to a door unlock switch 460 having an input coupled to the capacitive circuit for receiving the first charge and a control input coupled to the resistive capacitive circuit for closing the door unlock switch 460 in response to the second charge. The output of the door unlock switch 460 is then coupled to a vehicle door lock mechanism configured to unlock a vehicle door in response to the first charge wherein the door unlock switch 460 is closed in response to the second charge at the second time and the first charge is coupled to the vehicle door lock mechanism at the second time.

Figure 5:
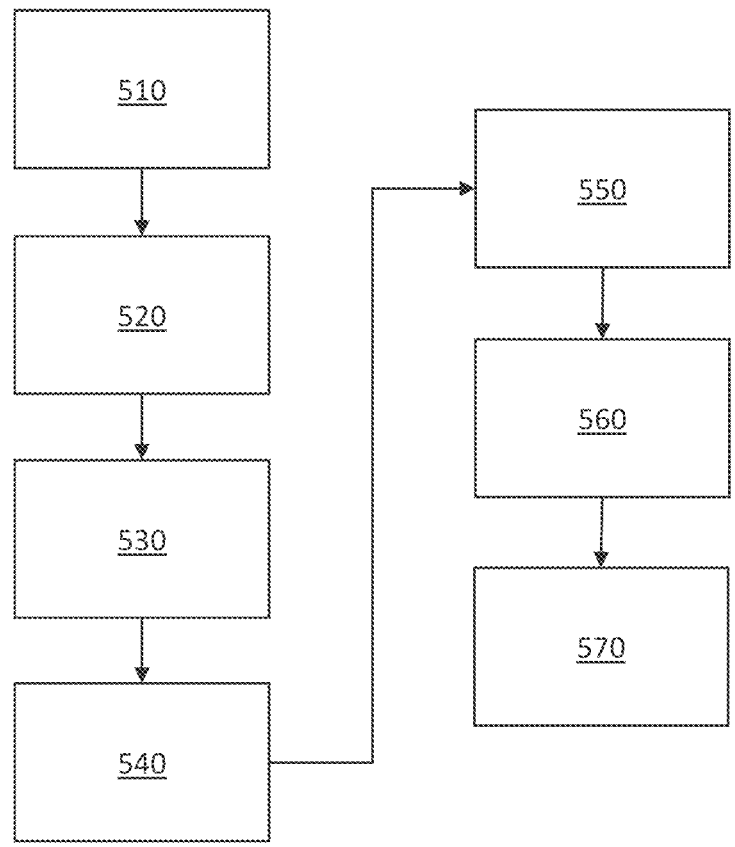
FIG. 5 shows a flowchart illustrating an exemplary method of implementation of the low power authentication and unlock system.

Turning now to FIG. 5, a flowchart illustrating an exemplary method 500 of implementation of the low power authentication and unlock system is shown. The method 500 for actuating a vehicle door lock mechanism is first configured for receiving 510, via an antenna, a door unlock signal; including authenticating the door unlock signal by an authentication processor to generate an authenticated door lock signal and wherein the battery charge is coupled to the capacitive circuit and the resistive capacitive circuit via the switch in response to the authenticated door lock signal. wherein the antenna is a near field communication antenna and wherein the authentication processor is powered in response to the authentication signal wherein the antenna is a near field communication antenna and wherein the battery is charged in response to the door unlock signal. wherein the door unlock signal is transmitted by a service provider via a wireless network. wherein the door unlock signal is transmitted from a mobile device in response to a user input.

The method is next configured for coupling 520, by a switch, a battery charge from a battery to a capacitive circuit and a resistive capacitive circuit in response to the door unlock signal. In response to the battery charge, the capacitive circuit may next generate 530 a first charge at a first time in response to charging a capacitor with the battery charge and overcome a drop voltage of one or more diodes. One or more diodes may be used to keep the generated first charge from being coupled back to the battery or any other portion of the circuit. The first charge is coupled to an input of a relay.

The method is next configured for generating 540, by the resistive capacitive circuit, a second charge at a second time, wherein the second time is later than the first time. In one example, the time delay between the second time and the first time results from a reactance of the resistive capacitive circuit. The second charge is generated in response to charging a second capacitor through a resistor with the battery charge and overcome a drop voltage of one or more diodes. One or more diodes may be used to keep the generated second charge from being coupled back to the battery or any other portion of the circuit Once the second time has been reached, the second charge is then coupled 550 to a relay control port at the second time. In response, to the second charge at the control port, the relay is then closed 560 coupling the first charge to a door unlock mechanism at the second time. At the second time, the first charge is at a maximum voltage as the first capacitor is fully charged.

The method is then operative for actuating 570 the vehicle door lock mechanism in response to the first charge coupled to the vehicle lock mechanism from the capacitive circuit via the relay. The vehicle lock mechanism may be actuated using an electric powered actuator. The electric powered may be assisted by a mechanical assist device such as a spring, weight, etc.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An unlock system comprising:
   a door unlock mechanism;
   a capacitive circuit having a first time response;
   a resistive-capacitive circuit having a second time response wherein the second time response is longer than the first time response;
   a battery for coupling a battery charge to the capacitive circuit and the resistive capacitive circuit in response to a door unlock authentication signal; and
   a relay for coupling a first charge from the capacitive circuit to the door unlock mechanism in response to the relay being activated by a second charge from the resistive-capacitive circuit after the second time response.

2. The unlock system of claim 1 further comprising an antenna for receiving an authentication signal and a processor for coupling a control signal to the battery in response to the authentication signal wherein the battery charge is coupled from the battery to the capacitive circuit and the resistive capacitive circuit in response to the control signal.

3. The unlock system of claim 2 wherein the antenna is a near field communication antenna and wherein the battery is charged in response to the authentication signal.

4. The unlock system of claim 2 wherein the antenna is a near field communication antenna and wherein the processor is powered in response to the authentication signal.

5. The unlock system of claim 1, wherein the first charge is at a maximum voltage at the second time response.

6. The unlock system of claim 1, wherein the authentication signal is transmitted by a service provider via a wireless network.

7. The unlock system of claim 1, wherein the authentication signal is transmitted from a mobile device in response to a user input.

8. The unlock system of claim 1, further comprising an interlock for coupling the a second charge from the resistive capacitive circuit to the relay and wherein the a second charge is not coupled to the relay by the interlock in response to the interlock receiving an interlock signal generated by a door latch control module.

9. A method for actuating a vehicle door lock mechanism comprising:
   receiving, via an antenna, a door unlock signal;
   coupling, by a switch, a battery charge from a battery to a capacitive circuit and a resistive capacitive circuit in response to the door unlock signal;
   generating, by the capacitive circuit, a first charge at a first time;
   generating, by the resistive capacitive circuit, a second charge at a second time, wherein the second time is later than the first time;
   coupling the first charge to a relay at the first time;
   closing the relay in response to the second charge at the second time; and
   actuating the vehicle door lock mechanism in response to the first charge coupled to the vehicle lock mechanism from the capacitive circuit via the relay.

10. The method for actuating a vehicle door lock mechanism of claim 9 wherein a time delay between the second time and the first time results from a reactance of the resistive capacitive circuit.

11. The method for actuating a vehicle door lock mechanism of claim 9, further including authenticating the door unlock signal by an authentication processor to generate an authenticated door lock signal and wherein the battery charge is coupled to the capacitive circuit and the resistive capacitive circuit via the switch in response to the authenticated door lock signal.

12. The method for actuating a vehicle door lock mechanism of claim 11 wherein the antenna is a near field communication antenna and wherein the authentication processor is powered in response to the authentication signal.

13. The method for actuating a vehicle door lock mechanism of claim 9, wherein the antenna is a near field communication antenna and wherein the battery is charged in response to the door unlock signal.

14. The method for actuating a vehicle door lock mechanism of claim 9, wherein the first charge is at a maximum voltage at the second time.

15. The method for actuating a vehicle door lock mechanism of claim 9, wherein the door unlock signal is transmitted by a service provider via a wireless network.

16. The method for actuating a vehicle door lock mechanism of claim 9, wherein the door unlock signal is transmitted from a mobile device in response to a user input.

17. A door unlock and authentication system comprising:
   an authentication processor configured for providing an authenticated door unlock signal in response to a received door unlock request;
   a battery for powering the authentication processor and providing an input charge;
   a switch for coupling the input charge to a capacitive circuit and a resistive capacitive circuit in response to the authenticated door unlock signal;
   the capacitive circuit for generating a first charge at a first time in response to the input charge;
   the resistive capacitive circuit for generating a second charge at a second time in response to the input charge;
   a relay having an input coupled to the capacitive circuit for receiving the first charge and a control input coupled to the resistive capacitive circuit for closing the relay in response to the second charge; and
   a vehicle door lock mechanism configured to unlock a vehicle door in response to the first charge wherein the relay is closed in response to the second charge at the second time and the first charge is coupled to the vehicle door lock mechanism at the second time.

18. The door unlock and authentication system of claim 17 wherein the door unlock requested is received from a user device via an antenna.

19. The door unlock and authentication system of claim 17 wherein the door unlock request forms a portion of a radio frequency signal received via a near field antenna and wherein the authentication processor is powered by the radio frequency signal.

20. The door unlock and authentication system of claim 17 wherein the door unlock request forms a portion of a radio frequency signal received via a near field antenna and wherein the battery is charged by the radio frequency signal.

* * * * *